Aug. 11, 1970    D. B. BROUGHTON    3,523,762
BAFFLED CHAMBER FOR A PLURALITY OF CONTACT BEDS
TO PRECLUDE DIFFUSED FLUID FLOW
Filed May 19, 1967

INVENTOR:
Donald B. Broughton

BY: *James R. Hoatson, Jr.*
*Philip T. Liggett*
ATTORNEYS

United States Patent Office 3,523,762
Patented Aug. 11, 1970

3,523,762
BAFFLED CHAMBER FOR A PLURALITY OF CONTACT BEDS TO PRECLUDE DIFFUSED FLUID FLOW
Donald B. Broughton, Evanston, Ill., assignor to Universal Oil Products Company, Des Plaines, Ill., a corporation of Delaware
Filed May 19, 1967, Ser. No. 640,463
Int. Cl. B01j 1/06, 1/22, 9/02
U.S. Cl. 23—285
4 Claims

ABSTRACT OF THE DISCLOSURE

A fluid-solids contacting chamber for a plurality of spaced packed beds where baffle means between beds are specially constructed with sloping upper and lower faces and, in addition, are specially designed and positioned with respect to each other to provide lateral fluid collecting and distributing passageway means where fluid flow velocities in such passageway are always the same at points on the same vertical line through the chamber. The particular baffling design and arrangement also maintains a desired square front or "plug-flow" for the fluid stream through the chamber without diffusion but will permit remixing and counteract the effects of any channeling in each bed.

The present invention relates to a novel arrangement and construction of special sloping-faced baffling for a multiple-bed fluid-solids contact chamber to provide a remixing of the fluid stream between beds without producing diffusion or interferring with a desired square front or "plug-flow" operation through the contacting chamber. More particularly, the present improved construction and operation of the multiple bed chamber is such that sloping or dish-like baffles are in particle-free zones between packed bed sections and these special baffle means will provide fluid velocities laterally in variable area fluid collecting and redistributing passageways below and above packed bed zones whereby in such passageway means there will be equal velocities above and below any particular bed at points on the same vertical line.

It is realized that fluid-solids contact chambers in various usages have incorporated baffling of the side to side variety or of the disc and doughnut designs; however, these known types of baffling do not preclude diffusion of the fluid stream in its passage through the packed chamber. For instance, in certain types of adsorption processing operations it is desirable to maintain a continuous, uniform (non-mixed) square front or plug-flow for the entire fluid stream carrying through a chamber having two or more packed beds of contact material. To accomplish this, it is necessary that sloping faced baffles be positioned in particle free areas between packed sections and that such baffles be designed and positioned to prevent horizontal mixing effects. Such conditions are of course not possible with conventional flat surfaced baffling, or with columns having the packed contact material entirely surrounding and contacting the baffle means therein.

SUMMARY OF THE INVENTION

It may be considered a principal object of the present invention to provide special baffling and lateral transition fluid passageways between beds for a multiple-bed packed chamber which will maintain a square-front flow stream through the chamber without causing horizontal mixing in the passageways or diffusion and interruption of the desired uniform flow.

Stated another way, it is considered a principal object of the invention to provide successive special baffle means in a fluid-solids contact chamber where there are upper and lower sloping faced portions to each baffle member and an arrangement where successive baffles will, in turn, provide special variable area fluid collecting and redistributing passageways above and below each baffle means with respect to the adjacent packed bed zones whereby the horizontal fluid velocities in such passageways are always equal at points selected on the same vertical line through the chamber to, in turn, maintain a desired uniform plug-flow through such packed chamber.

Broadly, the present invention provides in a fluid-solids contacting chamber having a plurality of spaced packed bed contact zones, the improved means for effecting remixing of fluid between zones while at the same time retaining a uniform plug-flow of fluid through the chamber, in a manner which comprises, effecting contact with a sloping faced baffle means between each zone that traverses a major portion of the cross-sectional area of the chamber, with each such baffle means and adjacent packed zones thus forming and bounding variable area unpacked fluid passageways above and below each particular packed zone, thereby effecting below each bed, a fluid flow laterally in a fluid collecting passageway increasing in volume to an over-flow zone of the baffle means at which zone there is effected a reversal in direction of flow and fluid then is passed substantially in a reverse lateral flow in a distributing passageway decreasing in size in the direction of flow while being uniformly redistributed to a next lower bed, and in all instances maintaining contours for said baffle means whereby fluid flow is such that the horizontal fluid velocities in said passageways above and below any particular packed bed zone are always the same at points on the same vertical line.

As hereinbefore set forth, it is desired to maintain the uniform square front or plug-flow type of movement for the fluid down through the contacting chamber but, at the same time, counteract the effect of channeling in the plurality of spaced beds by obtaining vertical mixing in varying cross-sectional area channels or passageways between contact beds as provided by the special baffle means. However, horizontal mixing is to be precluded in the channels or passageways by having such passageways resulting from the special baffle means provide for horizontal fluid velocities which above and below a particular bed, are equivalent at points occurring along the same vertical line within the chamber. Also, as a result, an element of fluid entering any particular passageway will reach a point of equivalent position at a next successive passageway at the same time as another element of fluid passing between the same points through the same bed, regardless of the path that is followed. Thus, for instance, if an element of fluid splits into many parts at a particular point in a passageway adjacent one baffle means above a bed and the various parts follow different paths to an equivalent point in a passageway adjacent a next lower baffle means, then all parts of the fluid will reach the lower point at the same time so that the original fluid element is theoretically reconstituted. In effect, the arrangement overcomes transportation lag which will occur with conventional baffling arrangements.

In a rectangular or square contacting chamber, the varying area channels or passageways for the fluid above and below baffle means therebetween spaced beds will of course vary linearly with the distance from the inside wall of the chamber and the baffle will have sloping flat plane surfaces. The result will be wedge shaped baffle means and upper sloping areas or surfaces of each baffle means will be symmetrically opposite to the sloping surface of the lower side of each baffle means.

With regard to circular chambers where the beds and baffle means are of a circular cross-section and there is radial outward flow around a convex shaped disc member as one baffle means and radial inward flow to an opening through a doughnut-like next adjacent baffle means, there will be sloping or dish shaped surfaces that are parabolic in cross-sectional configuration so as to provide the desired equal velocity lateral flows in the varying area passageways above and below a particular bed at points on the same vertical line. Again, the arrangement of the parabolic-surfaced baffle means will provide that an element of fluid passing a particular first position with respect to one baffle means will reach an equivalent point with respect to a next lower baffle means at the end of the same period of time as another element of fluid passing said first position regardless of the path that is followed by the particular elements.

Reference to the accompanying drawing and the following description thereof will serve to more clearly illustrate the novel baffle arrangements providing an improved form of multiple bed of fluid-solids contacting chamber and a resulting operation adapted to maintain a desired uniform square front flow through the entire chamber.

Figure 1:
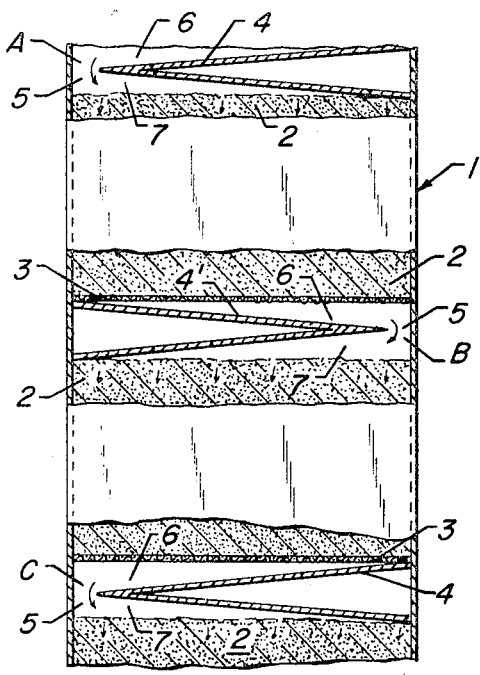
FIG. 1 of the drawing is a partial sectional elevational view through a multiple zone packed chamber with a special arrangement of baffle means adapted for a chamber of rectangular cross-section.

Referring now particularly to FIG. 1 of the drawing there is indicated a rectangular or square form of chamber 1 having spaced apart superposed contact beds 2. The latter for example may comprise a catalyst or a suitable adsorbent material such as utilized in selective adsorption process operations for the chemical or petroleum fields. It is not intended to limit the present invention to any one type of fluid-solids contacting operation or to the use of any one particular solids contact material, whether it be inert, catalytic or of a particular selective adsorption capacity. Generally, although not necessarily, each bed will be of a similar depth and will be supported by suitable perforate screening or plate means indicated as 3.

In particle-free unpacked zones between adjacent beds there will be positioned sloping-faced baffle means 4 and 4', with the respective baffles being positioned symmetrically opposite to one another for the height of the chamber. Each of the baffle means 4 and 4', for the present rectangular chamber, will be of a wedge shape and each will have a sloping upper face descending to a point or apex terminating short of the opposing inside face of the chamber such that, in each instance, there is an overflow passageway zone 5. Also, the upper sloping faces of the baffle means 4 and 4' will provide diverging passageways 6 for collecting fluid from each next adjacent contact bed or zone 2. In a symmetrically opposing manner there will be formed fluid distributing passageways 7 below the lower face of each baffle means 4 and 4' so that the laterally flowing fluid is redistributed to each next lower bed of contact material in a uniform manner. Actually, each of the passages or channels will decrease in cross-sectional area to a point adjacent the inside wall of the chamber, where the height of the passageway is zero. In all cases, the baffle means 4 and 4' extend from an inside wall of the chamber in the opposing symmetrical manner, as shown in the drawing, with the upper face starting at a point in contact with the lower surface of a superposed contact bed 2 whereby the initial height of each passageway channel 6 is zero and then increases to a maximum height at the zone 5 just beyond the overflow edge of each of the baffle means. Similarly, the lower face of each baffle means slopes downward so that there is a maximum height at the zone 5 and a decrease in height of the channel or passageway to zero at the opposing side where the lower face of the baffle contacts the inside of the chamber wall.

In the operation of the thus baffled chamber, fluid is collected from a superposed contact bed 2 into each of the collecting passageways or channels 6 and then it is caused to flow laterally to each of the overflow zones 5 where there is a reversal in direction to provide a substantially reverse lateral flow in each of the passageways 7. From each of the latter, there is a uniform redistribution of fluid downwardly into a next lower bed 2 with fluid flow reaching the opposing end of the channel where its height is zero. As previously noted for a rectangular form chamber, the height of each channel along a horizontal line will vary linearly with distance from an inside face of the chamber. This leads to flat surfaced wedge-shaped channel members 4 and 4' and, in effect, resulting wedge-shaped fluid passageways above and below respective baffle means or with respect to the adjacent packed bed zones. The resulting flow is such that horizontal fluid velocities in the channels above and below a particular bed, or a particular baffle means, are always the same at points along the same vertical line. Still further, this accomplishes a uniform type of square-front flow through the chamber without introducing horizontal mixing or undesired diffusion into such flow. On the other hand, there may be vertical mixing of fluid elements within each of the tapering channels or passageway means 6 and 7 as the fluid is collected and redistributed to overcome channeling or interruptions of uniform fluid flow down through any particular contact bed 2. For example, a fluid element passing the apex of a baffle at zone A will reach a similar point B in the zone 5 at the next lower overflow zone at the same time, regardless of the path being followed by the element of fluid. Similarly, a fluid element leaving point B will reach a point C at the next lower zone in a similar lapse of time, regardless of the path followed through the next lower contact bed 2.

Figure 2:
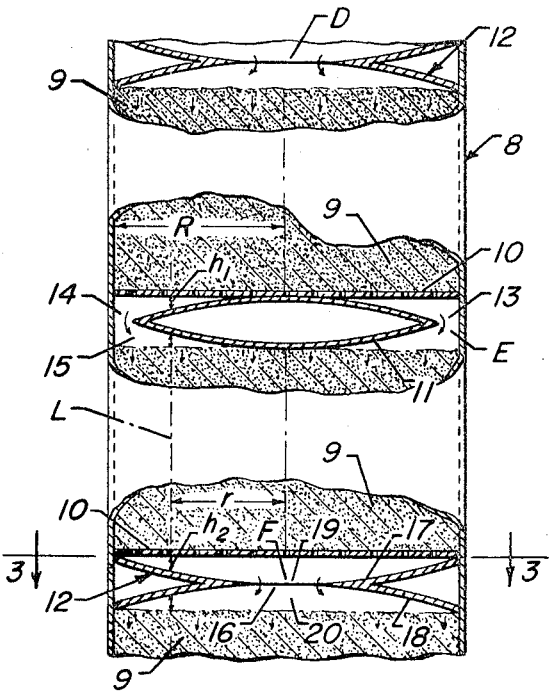
FIG. 2 of the drawing is a partial sectional elevational view through a multiple bed fluid-solids contacting chamber of a circular cross-section and the special baffle means adapted thereto for maintaining a desired uniform undiffused flow through such type of chamber.
Figure 3:
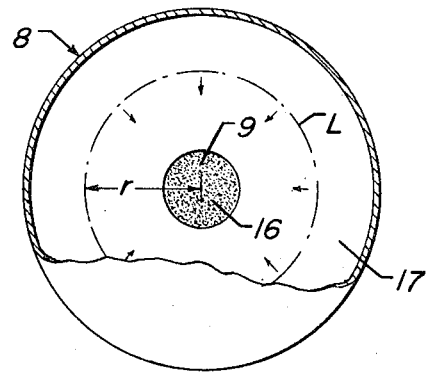
FIG. 3 of the drawing is a diagrammatic sectional plan view through a circular form contacting chamber, as indicated by line 3—3 in FIG. 2.

With regard to FIGS. 2 and 3 of the drawing, there is indicated a circular chamber 8 having a plurality of vertically spaced packed beds 9 which, in turn, are supported by suitable screen or perforate plate means 10. Particle-free spaces are provided between each of the superposed beds 9 and such spaces are utilized for specially formed convex and concave baffling means indicated respectively as 11 and 12. Each convex or outwardly dished baffle means 11 is circular in plan view, and will, of course, have an outer circumference or periphery somewhat smaller than the inside diameter of chamber 8. Thus, there is a suitable fluid overflow zone 13, which is of an annular shape, at the level of each baffle 11. Actually, each of the upper and lower surfaces of baffle means 11 is of a parabolic configuration in order to provide the desired uniform square-front flow through the unit and passageway means and also maintain the horizontal fluid velocities that are equivalent along all points above and below beds that are in the same vertical line. With a circular chamber, there is a radially diverging or enlarging passageway 14 suitable for collecting fluid from a next higher contact bed 9 and carry it to the annular zone 13. Conversely, there is a converging fluid passageway 15 below each baffle means 11 that carries the fluid from the annular area 13 in a redistribution lateral flow to a next lower contact bed 9. Channel or passageway 15 will, of course, be symmetrically opposite in configuration to that of the upper channel 14, while fluid flow is in the opposite direction in order to effect the desired redistribution, rather than fluid collection.

With respect to the baffle means 12, there are opposing surfaces which slope from an outer circumferential edge along the inside wall of the chamber to a small diameter fluid overflow zone 16. However, in order to maintain a uniform square-front flow in the chamber, then the cross-sectional area of overflow zone 16 shall be substantially equivalent to the area of the annular zone 13 at the next adjacent baffle means 11. The upper and lower surfaces or faces for baffle means 12 will again be of a parabolic configuration in order that the desired fluid collections and redistributions will maintain uniform lateral velocities above and below a particular bed which are the same at points along the same vertical line of the chamber. Still further, the upper and lower faces, shown respectively as 17 and 18 for baffle means 12, will form respective upper and lower passageway means 19 and 20 with respect to the next adjacent upper and lower contact beds 9. Thus, in operation, the passageway 19 will collect fluid from a next higher bed 9 and carry it horizontally or laterally in a radially diverging flow to the passageway area 16 where there is a reversal in direction in the flow and the fluid then passes radially outwardly and in a converging manner by reason of the non-linear variation in height of the passageway so that there is uniform redistribution of fluid flow down to the next lower bed 9.

For baffle means 12, the outer periphery thereof will come into contact with the inside wall of the chamber 8 and, at the same time, there is abutment with the lower extremity of the next upper contact bed 9 such that the height of the channel or passageway is zero. As a result there is non-linear divergence of channel 19 along the parabolic face 17 of baffle unit 12 to a maximum height at the overflow area 16. In the reverse manner, there is a maximum height for channel 20 at the center of the baffle means 12 and a decreasing cross-sectional area in the direction of flow along the parabolic dished surface 18 to a height of zero upon contact with the inside wall of chamber 8.

In order that there be the desired equivalent horizontal fluid velocities in the upper and lower channels 14 and 15 at baffle means 11, as well as for channels 19 and 20 at baffle means 12, there must exist suitable height relationships for each of the passageway means along any given vertical line in the chamber (or in a circular plane with respect to the axis of the chamber). By way of explanation, with reference to FIGS. 2 and 3, each of the incremental heights $h_1$, as shown in a particular vertical line L (or plane L in FIG. 3), above and below baffle means 11, will have a particular relationship with respect to incremental heights $h_2$ along the same line L above and below the dished baffle means 12. This relationship may be established by volumes of fluid passing in the particular channels 14 and 15 being equivalent to the volumes of fluids passing adjacent the next lower baffle means as provided by channels 19 and 20. Thus, where R=the radius of the inside of the chamber 8 and $r$ is the radius from the axis thereof out to the line L, then for heights at $h_1$ and $h_2$ there is a ratio established that $$\frac{h_1}{h_2} = \frac{R^2 - r^2}{r^2}$$

The $h_1$ and $h_2$ heights of course vary with changes in $r$ and will result in slightly differing parabolic surfaces for the baffle 11 as compared with surfaces of baffle 12.

In any case, by the use of the special sloping faced convex and concave baffling, indicated respectively as 11 and 12, and with the resulting parabolic configurations for their respective faces, there will be provided the desired uniform plug-flow or square-front flow achieved through the chamber 8. Still further, there will be the desired preclusion of horizontal mixing or diffusion while maintaining the plug-flow of fluid in the chamber. However, there can be vertical mixing in the passageway zones so as to overcome any effects of undesired channeling in the spaced beds 9. With the horizontal fluid velocities in the passageways being made equivalent along points on the same vertical line in the chamber by the special parabolic configurations of baffling, there will, of course, again result the desired equivalent time flows for elements of fluid passing down through the chamber. In other words, all fluid elements passing opening D at the central point in an upper baffle 12 will reach a point E along the inside wall of the chamber 8, in equivalent time periods regardless of paths taken. Also, all fluid elements leaving point E adjacent baffle means 11 and reaching point F (or area 16) at a next lower baffle means 12 will utilize an equivalent period of time, regardless of the path being followed by a particular fluid element.

Figure 4:
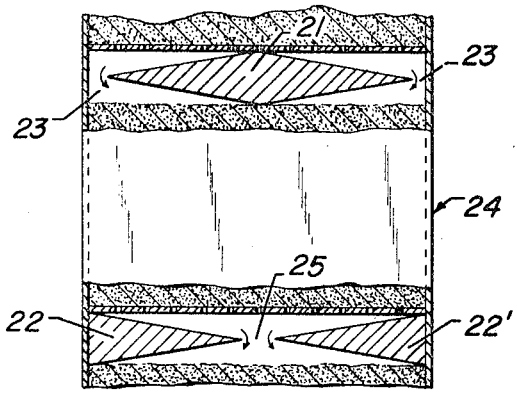
FIG. 4 merely indicates modified forms of baffle means of an optional design that may be utilized for a rectangular cross-section packed chamber.

For cylindrical vessels the baffle means will necessarily be of the parabolic faced configurations such as indicated in the FIG. 2; however, for square or rectangular members there may be certain modifications and different arrangements in the designs of the staggered baffling means to effect the desired uniform horizontal velocities in the fluid channels or passageways above and below contact zones. For example, as shown in FIG. 4 of the drawing there may be a staggered or alternating positioning of baffle means such as 21, 22 and 22'. For simplification of the drawing certain of the intermediate packed bed zones and support means have not been shown; however, as indicated with the other embodiments, there will be the utilization of the required special baffle means in particle-free zones between adjacent packed bed zones. In this embodiment, a dual wedge-shaped baffle means, such as 21, will provide for flat plane surfaces which slope two ways on an upper face and two ways on a lower face. Thus, fluid in a collecting passageway below a bed will pass in an enlarging cross-sectional area to an overflow section 23 adjacent inside wall portions 24 of the particular chamber. Conversely, at the next lower baffle means 22 and 22', which comprise opposing wedge-shaped members extending outwardly from opposing inside walls of the chamber 24, there will be provided a central passageway area 25 for the overflow and redistribution of liquid to a next lower contact bed. In order to maintain the uniform flow, the area at zone 25 will be equivalent to the sum of the areas of fluid passageways 23 on each side of the one piece baffle means 21. Again, the passageways resulting from the configurations of the baffles of FIG. 4 will be such that the horizontal fluid velocities in any of the channels above and below a particular bed are also the same along the same vertical line, or same vertical plane in the rectangular form chamber. The result is the desired uniform and undiffused square-front flow through the chamber with only vertical remixing being effected in the respective unobstructed fluid channels at the zones of the baffles so as to overcome any channeling that may be present in the plurality of superposed contact beds.

In extremely wide rectangular chambers, there may be a number of baffle members, such as 21, extending transversely across the particular chamber so as to provide multiple fluid overflow areas and multiple diverging and converging passageways above and below the baffle means and with respect to adjacent contact beds, as long as the configurations are symmetrically uniform and will provide for the horizontal fluid velocities being equivalent in points of the channels above and below the beds along the same vertical line.

I claim as my invention:

1. In a fluid-solids contacting chamber having a plurality of spaced packed bed contact zones, the improved means for obtaining remixing of fluid between zones while retaining a uniform plug-flow of fluid therethrough, which comprises a sloping-faced baffle means between each packed zone that has symmetrically opposing upper and lower faces which traverse a major portion of the cross-sectional area of the chamber, each of said faces being disposed symmetrically opposite to the adjacent face of a next baffle means, each such baffle means and adjacent packed zones thus forming and bounding variable area unpacked fluid passageways above and below each particular packed zone, with such passageways being in a resulting staggered arrangement to provide laterally alternating positions for fluid flow through the chamber, thereby effecting below each bed, a fluid flow laterally in a fluid collecting passageway increasing in volume to an overflow zone of the baffle means at which zone there is effected a reversal in direction of flow and fluid then is passed substantially in a reverse lateral flow in a distributing passageway decreasing in size in the direction of flow while being uniformly redistributed to a next lower bed, and in all instances maintaining contours for said baffle means whereby fluid flow is such that the horizontal fluid velocities in said passageways above and below any particular packed bed zone are always the same at points on the same vertical line.

2. The fluid-solids contacting chamber of claim 1 further characterized in that said chamber is of a rectangular cross-section and said sloping faced baffle means are of a wedge-shape in cross-section and are positioned substantially horizontally with the tip ends of successive baffle means being staggered with respect to one another and spaced from inside walls of said chamber to provide alternating positions for fluid flow through the chamber.

3. The fluid-solids contacting chamber of claim 1 further characterized in that said chamber is of a circular cross-section and said upper and lower faces comprise alternating parabolically shaped baffle members with one of said members having convex parabolic-shaped upper and lower faces positioned to have an outer circumferential overflow edge, and the member which constitutes the baffle means of the next packed zone having concave parabolic shaped upper and lower faces which respectively slope to and from a central fluid-flow opening.

4. The fluid-solids contacting chamber of claim 3 further characterized in that said parabolically dish-shaped baffle members are shaped to provide incremental clearances from any adjacent packed bed zone, along a vertically projected line such that the ratios of heights $h_1/h_2$ (where $h_1$=clearance heights above and below one baffle with respect to adjacent packed bed zones on a given vertical line and $h_2$=clearance heights above and below a next adjacent baffle with respect to its adjacent packed bed zones, on the same vertical line) is equal to the ratio $$\frac{R^2-r^2}{r^2}$$

(where $R$= radius of chamber and $r$=the distance from the axis of the chamber to the given vertical line for measuring heights $h_1$ and $h_2$).

References Cited

UNITED STATES PATENTS

| | | | |
|---|---|---|---|
| 910,207 | 1/1909 | Keep | 261—97 |
| 1,951,917 | 3/1934 | Leslie | 210—284 X |
| 3,214,247 | 10/1965 | Broughton | 23—288 |
| 3,233,981 | 2/1966 | Scott | 23—288.3 X |

MORRIS O. WOLK, Primary Examiner

D. G. CONLIN, Assistant Examiner

U.S. Cl. X.R.

23—284, 288; 210—284, 285; 261—97